United States Patent
Luo et al.

(10) Patent No.: US 9,963,109 B2
(45) Date of Patent: May 8, 2018

(54) VEHICLE CONTROL SYSTEM TO PREVENT RELAY ATTACK

(71) Applicant: Huf North America Automotive Parts Manufacturing Corp., Milwaukee, WI (US)

(72) Inventors: Yi Luo, Northville, MI (US); John Nantz, Brighton, MI (US)

(73) Assignee: HUF NORTH AMERICA AUTOMOTIVE PARTS MFG. CORP., Milwaukee, WI (US)

( * ) Notice: Subject to any disclaimer, the term of this patent is extended or adjusted under 35 U.S.C. 154(b) by 15 days.

(21) Appl. No.: 15/039,128

(22) PCT Filed: Dec. 2, 2014

(86) PCT No.: PCT/US2014/068169
§ 371 (c)(1),
(2) Date: May 25, 2016

(87) PCT Pub. No.: WO2015/084852
PCT Pub. Date: Jun. 11, 2015

(65) Prior Publication Data
US 2017/0158169 A1    Jun. 8, 2017

Related U.S. Application Data

(60) Provisional application No. 61/911,225, filed on Dec. 3, 2013, provisional application No. 61/975,447, filed on Apr. 4, 2014.

(51) Int. Cl.
*B60R 25/24* (2013.01)
*B60R 25/40* (2013.01)
*G07C 9/00* (2006.01)

(52) U.S. Cl.
CPC .......... *B60R 25/245* (2013.01); *B60R 25/406* (2013.01); *G07C 9/00015* (2013.01);
(Continued)

(58) Field of Classification Search
CPC ................ B60R 25/245; B60R 25/406; B60R 2325/108; B60R 25/24; G07C 9/00015;
(Continued)

(56) References Cited

U.S. PATENT DOCUMENTS 7,705,710 B2    4/2010  Hermann
7,791,457 B2 *  9/2010  Ghabra ................... B60R 25/24
                                                340/426.36
(Continued)

FOREIGN PATENT DOCUMENTS

EP    1403653 A1    3/2004
EP    1920978 A2    5/2008
(Continued)

OTHER PUBLICATIONS

Korean Patent Office, Office Action for KR Application No. 10-2016-7017737, dated Jan. 10, 2017.
(Continued)

*Primary Examiner* — Ali Neyzari
(74) *Attorney, Agent, or Firm* — Honigman Miller Schwartz and Cohn LLP; Matthew H. Szalach; Jonathan P. O'Brien

(57) ABSTRACT

A passive entry system for an automotive vehicle that is configured to prevent relay attacks by analyzing magnet vectors and angles created by a plurality of antennas mounted on the vehicle is disclosed. A vehicle including a control unit configured to broadcast a wake-up signal to prompt a fob to power-up if the fob is in a low-power consumption mode and to transmit signals through a plurality of antennas coupled to the vehicle is provided, along
(Continued)

with a fob configured to recognize the wake-up signal and to generate a response signal for the control unit in response to recognize the wake-up signal. The fob includes a controller that is programmed to receive signals transmitted from each of the plurality of antennas coupled to the vehicle, retrieve constant values from stored a memory, and calculate a magnetic integrity defining the relative position of each of the plurality of antennas. The controller allows access to the vehicle if magnetic integrity is found, and denies access to the vehicle if magnetic integrity is not found.

19 Claims, 12 Drawing Sheets

(52) U.S. Cl.
CPC ..... *G07C 9/00309* (2013.01); *G07C 9/00722* (2013.01); *B60R 2325/108* (2013.01); *G07C 2009/0038* (2013.01); *G07C 2009/00412* (2013.01); *G07C 2009/00547* (2013.01); *G07C 2009/00555* (2013.01); *G07C 2009/00984* (2013.01)

(58) Field of Classification Search
CPC ............ G07C 9/00309; G07C 9/00722; G07C 2009/0038; G07C 2009/00412; G07C 2009/00555; G07C 2009/00984; G07C 2009/0547

USPC .................................. 340/5.72, 5.61, 426.36
See application file for complete search history.

(56) References Cited

U.S. PATENT DOCUMENTS

| 8,044,770 B2 | 10/2011 | Nakajima et al. |
| 2016/0200291 A1* | 7/2016 | Kim ...................... B60R 25/30 |
| | | 701/2 |

FOREIGN PATENT DOCUMENTS

| JP | 2006266077 A | 10/2006 |
| JP | 2008115648 A | 5/2008 |
| WO | WO-2009150510 A2 | 12/2009 |
| WO | WO-2010120715 A1 | 10/2010 |

OTHER PUBLICATIONS

International Searching Authority, International Search Report and Written Opinion for PCT Application No. PCT/US2014/068169, dated Mar. 20, 2015.

* cited by examiner

FORM 1

FORM 2

VEHICLE CONTROL SYSTEM TO PREVENT RELAY ATTACK

CROSS-REFERENCE TO RELATED APPLICATIONS

This application is the national phase of International Application No. PCT/US2014/068169, filed Dec. 2, 2014, which claims the benefit of U.S. Provisional Patent Application No. 61/911,225, filed Dec. 3, 2013, and U.S. Provisional Patent Application No. 61/975,447, filed Jan. 4, 2014, the disclosures of which are hereby incorporated by reference in their entirety.

BACKGROUND OF THE INVENTION

Traditionally, door access and authorization to start a vehicle such as an automobile has been achieved using physical key and lock systems. In these systems, inserting a correct key into the door and ignition locks enabled the user to enter and drive the car.

In recent years, however, traditional key systems have been augmented with, and in many cases replaced, with remote keyless entry (RKE) devices in which users are able to open their car remotely by pressing a button on a portable communication device such as a key fob or key card. In these systems, the authorization to drive typically continued to be provided by physical key and lock systems. In some cases, however, physical keys included embedded immobilizer chips to prevent key copying.

Even more recently, complex embedded electronic systems have become common to provide access and start functions, and to provide wide ranging functions to improve driver safety and convenience. These systems include Passive Entry Passive Start (PEPS) systems. In PEPS systems, a remote receiver and transmitter (or transceiver) is carried with the user in a portable communication device such as a key fob or a card. The portable communication device when successfully challenged transmits a radio frequency (RF) signal to a module within the vehicle for performing a variety of remote vehicle function such door lock/unlock, enabling engine start, or activating external/internal lighting. Passive entry systems include a transmitter and receiver (or transceiver) in an electronic control module disposed within the vehicle. The transceiver is typically in communication with one or more devices (e.g., door lock mechanism) for determining when a request for actuation of a device is initiated (e.g., lifting a door handle) by a user.

Upon sensing the request for actuation, the transceiver broadcasts a passive entry interrogating signal. The fob upon receiving the interrogating signal from the ECU, the portable communication device determines if the interrogating signal is valid. If it is determined a valid signal, then the fob automatically broadcasts an output signal which includes an encrypted or rolling identification code to the electronic control module. The electronic module thereafter determines the validity of the output signal and generates a signal to the device to perform an operation (e.g., the door lock mechanism to unlock the door) if the output signal is determined valid.

Passive entry systems are susceptible to security threats such as relay attack. Relay attack occurs when a first thief triggers the actuation of an interrogation signal, for example, by lifting the vehicle door handle. The passive entry system in the vehicle broadcasts the interrogation signal, since it is expected the fob is in the vicinity of a user lifting the door handle. The first thief carries a repeater which receives the interrogation signal and retransmits the interrogation signal to a second thief in close proximity to a user having an authorized fob capable of broadcasting a response signal for unlocking the vehicle. The re-transmitted signal is typically a UHF signal which can be transmitted over a long range distance as opposed to a low frequency (LF) signal. The second thief also carrying a repeater device receives the UHF signal from the first thief. The signal is decoded and the re-transmitted as a LF signal to the user carrying the authorized fob. The fob receives the re-transmitted signal from the second thief and responds to the received interrogation signal accordingly. The second thief receives the response signal having the valid coded information therein and re-transmits the signal to the first thief. The first thief receives the authenticated response signal and transmits it to the vehicle. The vehicle receives the response signal, validates the signal, and unlocks the vehicle doors. The PEPS system can also be prompted to allow the thief to start the vehicle. The present disclosure addresses methods for preventing relay attacks of the type described above.

SUMMARY OF THE INVENTION

The present disclosure provides a passive entry system for an automotive vehicle that is configured to prevent relay attacks by analyzing magnet vectors and angles created by a plurality of antennas mounted on the vehicle. In one aspect, the disclosure provides a vehicle including a control unit configured to broadcast a wake-up signal to prompt a fob to power-up if the fob is in a low-power consumption mode and to transmit signals through a plurality of antennas coupled to the vehicle; and a fob configured to recognize the wake-up signal and to generate a response signal for the control unit in response to recognize the wake-up signal. The fob includes a controller that is programmed to receive signals transmitted from each of the plurality of antennas coupled to the vehicle, retrieve constant values from stored a memory, and calculate a magnetic integrity defining the relative position of each of the plurality of antennas. The controller allows access to the vehicle if magnetic integrity is found, and denies access to the vehicle if magnetic integrity is not found.

In another aspect, the present disclosure provides a passive entry system for an automotive vehicle. The vehicle includes a control unit configured to broadcast a wake-up signal to prompt a fob to power-up if the fob is in a low-power consumption mode and to apply a driving current to and transmit signals through a plurality of antennas coupled to the vehicle, and a fob configured to recognize the wake-up signal and to generate a response signal for the control unit in response to recognizing the wake-up signal. The fob includes a fob controller programmed to receive signals transmitted from each of the plurality of antennas coupled to the vehicle, calculate a first angle between the signals transmitted by at least two of the antennas, receive an encrypted signal from the control unit describing a change in driving current applied to the antenna, and calculate a second angle between the signals transmitted by at least two of the antennas. The controller compares the first angle to the second angle and denies access to vehicle functions if the first angle is substantially equal to the second angle.

DESCRIPTION

Figure 1:
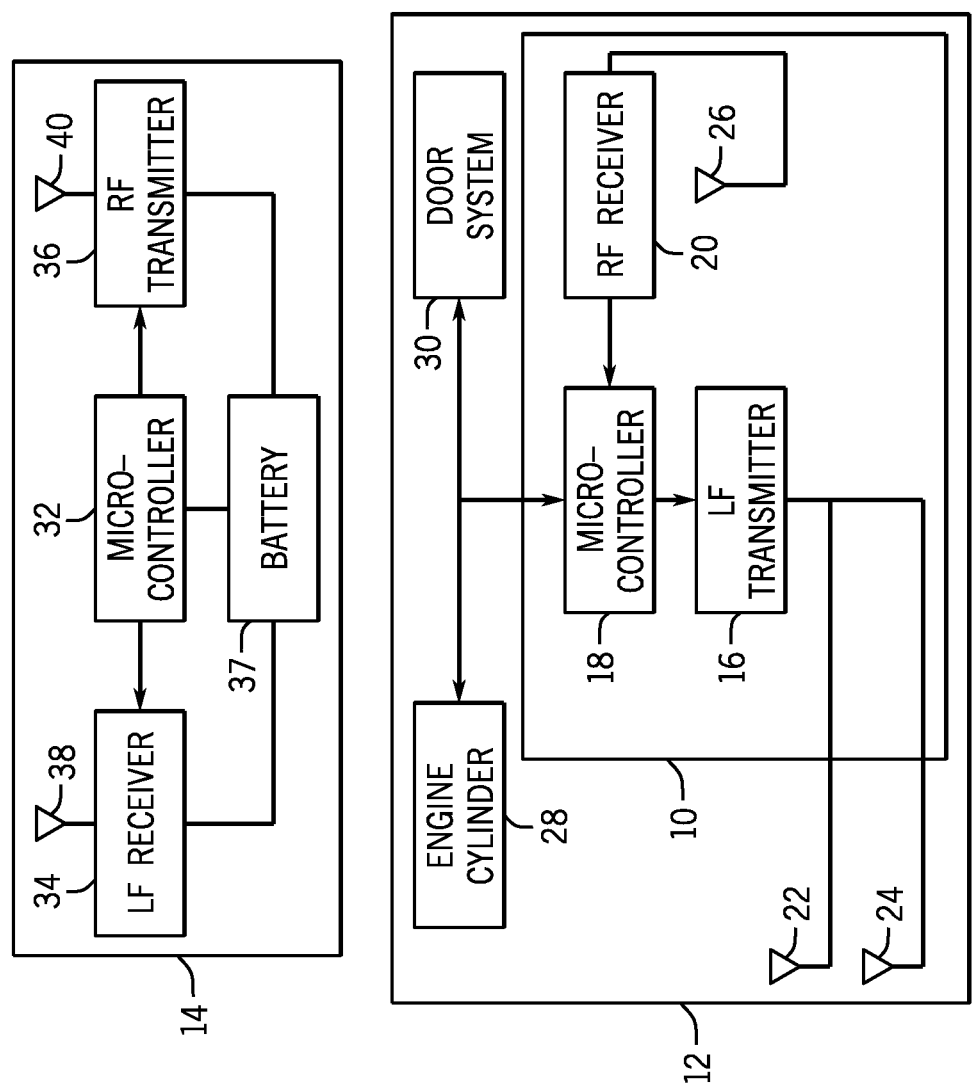
FIG. 1 is a block diagram of an automotive vehicle with a Passive Start and Entry System (PEPS) configured to communicate with a personal communication device or token.

Referring now to FIG. 1, an automotive vehicle 12 with a Passive Start and Entry System (PEPS) configured to communicate with a personal communication device or token 14, e.g., fob, card, etc. is shown. The automotive vehicle 12 includes an internal control system that comprises a micro-controller 16 electrically coupled with a low frequency transmitter 18 and a high frequency receiver 20, e.g., a radio frequency receiver. Other configurations and arrangements are, of course, also possible. For example, the micro-controller 16 may be electrically coupled with a high frequency transmitter (not shown) and/or a low frequency receiver (not shown). It is understood that the term passive entry system herein includes passive engine start systems in which this anti-theft system may be applied to.

As used herein the phrase "low frequency" typically refers to frequencies in the range of 3-300 KHz. The phrase "high frequency" or "ultra high frequency" (UHF) typically refers to frequencies in the range of 300 MHZ-3 GHz. Other ranges, however, are also possible. LF signals are most typically transmitted at 125 kHz while high frequency signals are most typically in the 300 MHz range.

In the embodiment illustrated in FIG. 1, antennas 22, 24 and 25 are electrically coupled with the low frequency transmitter 18. An antenna 26 is coupled with the radio frequency receiver 20. The position of the antennas 22, 24, 25 within the vehicle 12 is known by the micro-controller 16. As discussed below, this position information may be used by the micro-controller 16 and fob 14 to determine the location of the fob 14 relative to the antennas 22, 24, 25. For example, the antennas 22, 24, 25 may respectively be positioned on or near the roof and on or near a driver's side door and passenger's side door of the vehicle 12. In other embodiments, additional antennas (as well as additional receivers and/or transmitters) may be positioned throughout the vehicle to, inter alia, monitor additional regions of the vehicle 12, such as a trunk.

The micro-controller 16 of FIG. 1 may be coupled with an engine system 28 and a door system 30. The micro-controller 16 may control/monitor the operation of the systems 28, 30. For example, the micro-controller 16 may lock and unlock the door system 30 in response to receiving suitable remote keyless entry commands. In other embodiments, the micro-controller 16 may also be coupled with any suitable vehicle system to be controlled/monitored by the PEPS module to control lighting system or climate control system.

In the embodiment of FIG. 1, the fob 14 includes a micro-controller 32 electrically coupled with a low frequency receiver 34 and a high frequency transmitter 36, e.g., a radio frequency transmitter. In other embodiments, the micro-controller 32 may be electrically coupled with a high frequency receiver and/or a low frequency transmitter. Other configurations and arrangements are also possible. An energy storage unit 37, e.g., a battery, capacitor, etc., supplies power to the micro-controller 32, low frequency receiver 34 and high frequency transmitter 36.

A 3D coil antenna 38 is electrically coupled with the low frequency receiver 34. An antenna 40 is electrically coupled with the radio frequency transmitter 36. In other embodiments, the fob 14 may include buttons and/or a display (not shown) associated with remote keyless entry functions such as door locking/unlocking and panic alarm as well as others.

In the embodiment of FIG. 1, the low frequency receiver 34 of the fob 14 receives wake-up signals broadcast via the low frequency transmitter 18 from the vehicle 12. The wake-up signals prompt the micro-controller 34 to power-up from a low-power consumption mode in anticipation of further communications and in advance of executing further code.

An example passive entry sequence may begin when a door handle switch (not shown) of the door system 30 generates a triggering pulse. This triggering pulse is provided to the micro-controller 16. In response to the triggering pulse, the micro-controller 16 generates a trigger generation function. The low frequency transmitter 18 is activated to generate the low frequency wake-up signals, discussed above, associated with the trigger generation function. The low frequency wake-up signals are broadcast via the antennas 22, 24, 25. The low frequency wake-up signals respectively broadcast by the antennas 22, 24, 25 may include information indicative of the antenna from which it was broadcast.

As discussed above, the low frequency wake-up signals may facilitate locating the fob 14 relative to the antennas 22, 24, 25. In some embodiments, the low frequency receiver 34 includes suitable circuitry (not shown) for measuring a received signal strength indicator (RSSI) of each of the low frequency wake-up signals. The micro-controller 32 includes the RSSI information in a response sent to the controller 16. The controller 16 determines which antenna 22, 24, 25 is nearest the fob 14 based on the RSSI information. Locating the fob 14 relative to the antennas 22, 24, 25 may ensure that a user of the fob 14 is located in the area where the passive function is being requested. For example, locating the fob 14 relative to the antennas 22, 24, 25 may ensure that the user of the fob 14 is located outside the door system 30 when the door handle switch (not shown) is actuated. Likewise, locating the fob 14 relative to the antennas 22, 24 may reveal that the fob 14 is located within the cabin of the vehicle 12.

In certain embodiments, the micro-controller 16 generates a random number to be used as a seed number in a mathematical transformation that is also known by the micro-controller 32 as part of any suitable challenge/response validation sequence. A challenge signal that includes information indicative of the random number may be broadcast from the vehicle 12. The fob 14 receives the challenge signal. The micro-controller 32 applies the mathematical transformation to the random number. The transformed random number, as well as the RSSI information discussed above and a fob identifier, are included in a response sent to the vehicle 12. The micro-controller 16 may then check the fob identifier and the transformed random number to validate the fob 14.

The controller 32, as discussed above, may permit, for example, a user to unlock and/or start the vehicle 12. In some embodiments, a touch sensor or button on a door (not shown) triggers the controller 32 to begin the interrogation process described above. In other embodiments, a user of the fob 14 need not press/touch the fob 14 to, for example, unlock and/or start the vehicle 12. Rather, the user simply needs to approach the vehicle 12. In such embodiments, the controller 32 may periodically transmit, as discussed above, a wireless signal, e.g., a polling signal, to check if any fobs are within a vicinity of the vehicle 12. An example message rate may be approximately once a second in order to trigger a fob of a user that is approaching the vehicle 12. Any fob within the communication range may respond, as discussed above, to the polling signal. Thereafter, the controller 32 may initiate and complete the interrogation process described above before the user, for example, pulls a door handle (not shown).

Returning again to FIG. 1, the fob 14 may, as introduced above, recognize the polling signals broadcast by the controller 32. For example, the fob 14 may store one or more identifiers that are compared with a corresponding identifier embedded in the received polling signals. If the identifiers embedded in the polling signals match one of the stored identifiers, the fob 14 may recognize the polling signals.

In some embodiments, the fob 14 may store a global identifier and a local identifier. The global identifier may be common to some or all fobs produced by a manufacturer of such fobs and may be used, for example, to test a batch of fobs produced by the manufacturer. Other uses, however, are also possible. The local identifier may be specific to a certain vehicle and may be broadcast, for example, via the polling signals. As such, fobs for different vehicles may have the same global identifier but different local identifiers.

The fob 14 illustrated in FIG. 1 may store the local identifier in memory (not shown) associated with the low frequency receiver 34 ("receiver memory") and memory (not shown) associated with the micro-controller 32 ("micro-controller memory"). The fob 14 may store the global identifier in the micro-controller memory. During an example recognition process, the fob 14 may compare the identifier embedded in the received polling signals against the copy of the local identifier stored in the receiver memory and the copy of the global identifier stored in the micro-controller memory. If the received identifiers match any of the aforementioned stored identifiers, the fob 14 recognizes the polling signals and powers-up in anticipation of further communication, e.g., transmission of a response signal, data processing, etc. If the received identifiers do not match the stored identifiers, the fob 14 does not recognize the polling signals. As apparent to those of ordinary skill, a greater amount of power from the battery 37 is consumed if the fob 14 recognizes the polling signals because the fob 14 powers-up if it recognizes the polling signals.

Figure 2:
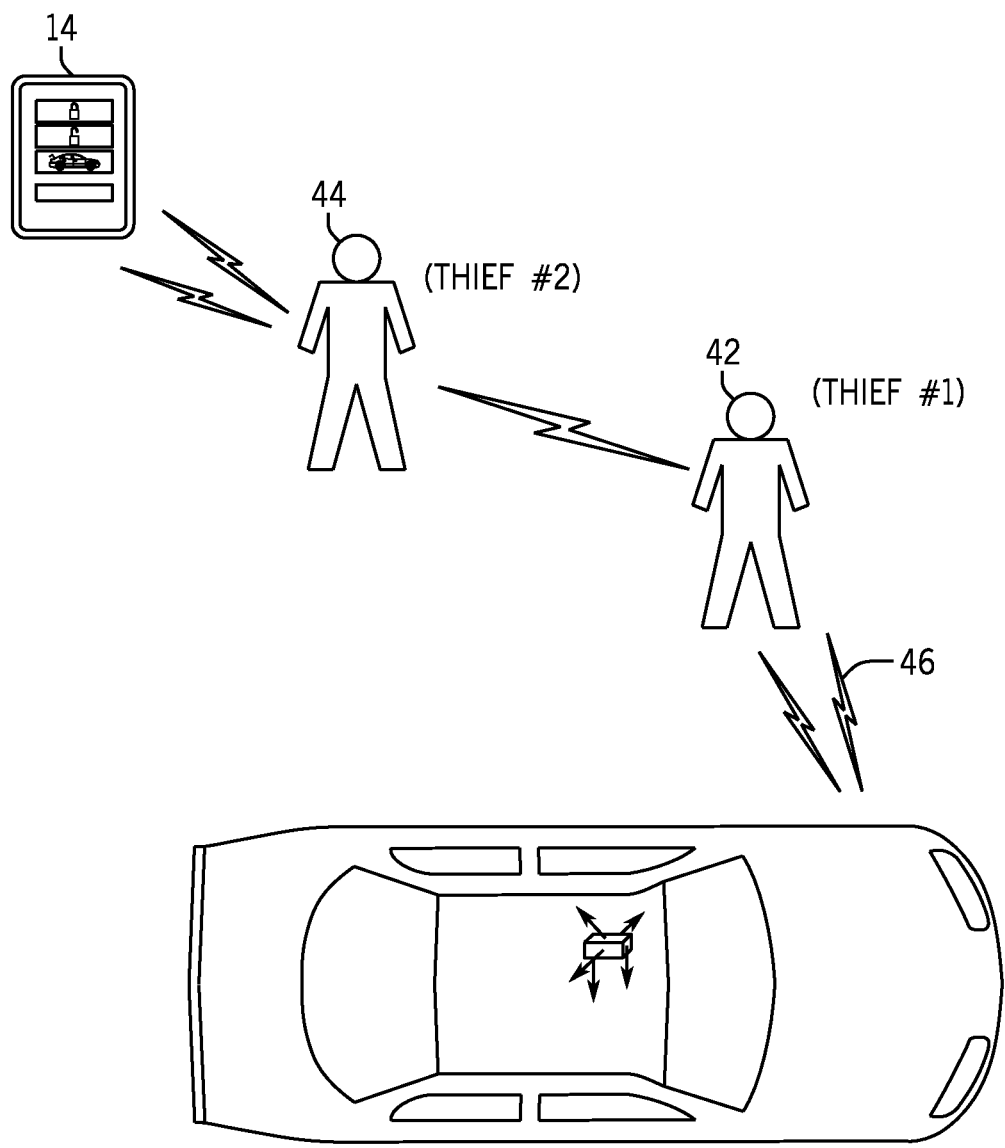
FIG. 2 is a simplified diagram of a vehicle illustrating a relay attack.

Referring now to FIG. 2 in a relay-attack event, a first thief 42 actuates the passive entry system by performing an initiation event such as lifting a door handle, as described above. The first thief 42 carries a first device, such as a first repeater device (not shown), for receiving the LF signal broadcast by the controller 32 via the LF antennas 22, 24, and 25. LF signals, as described above, are typically broadcast at 125 KHz. The first device demodulates the received interrogation signal 46 and attempts to reproduce the interrogation signal 46 as a UHF signal (e.g., 800 MHz). The interrogation signal 46 is transmitted as a high frequency or UHF signal to a second repeater device carried by a second thief 44. The second thief is positioned in close proximity to a user carrying an authorizing fob 14. The signal transmitted by the first thief 42 is transmitted as a UHF signal so that the communication signal has sufficient signal strength for communicating the reproduced signal over a large distance (i.e., larger than that what can be achieved by a LF signal) to the second thief 44. As a result, the user carrying the fob 14 need not be in close proximity to the vehicle 12; rather, the user may be at a distance far away from the vehicle 12 such that the first thief's actions at the vehicle 12 are unobservable to the user carrying the authenticating fob 14.

The second repeater device carried by the second thief 44 receives and demodulates the UHF signal in an attempt to reproduce the original interrogation signal 46. In response to demodulating the UHF signal, the second repeater device carried by the second thief 44 modulates the data of the received signal and transmits the data as a reproduced LF signal to the fob 14 in an attempt to duplicate the original LF signal broadcast by the controller 32. The reproduced LF signal from the second thief 44 is received by the nearby fob 14. If the data of the received LF signal matches the authenticating data stored in fob 14, a response signal is transmitted by the fob 14. The second repeater device carried by the second thief 44 receives the response signal transmitted by the fob 14. The response signal is demodulated and re-transmitted as a reproduced response signal to the first thief 42. The repeater device carried by the first thief 42 receives the signal and broadcasts the reproduced response signal to controller 32 of the vehicle 12 for obtaining access to the vehicle 12.

In the event the LF communication signal broadcast by the second thief 44 to the fob 14 does not match the authenticating data stored in the memory of the fob 14, then the fob 14 remains non-responsive and the relay-attack is thwarted.

Figure 3A:
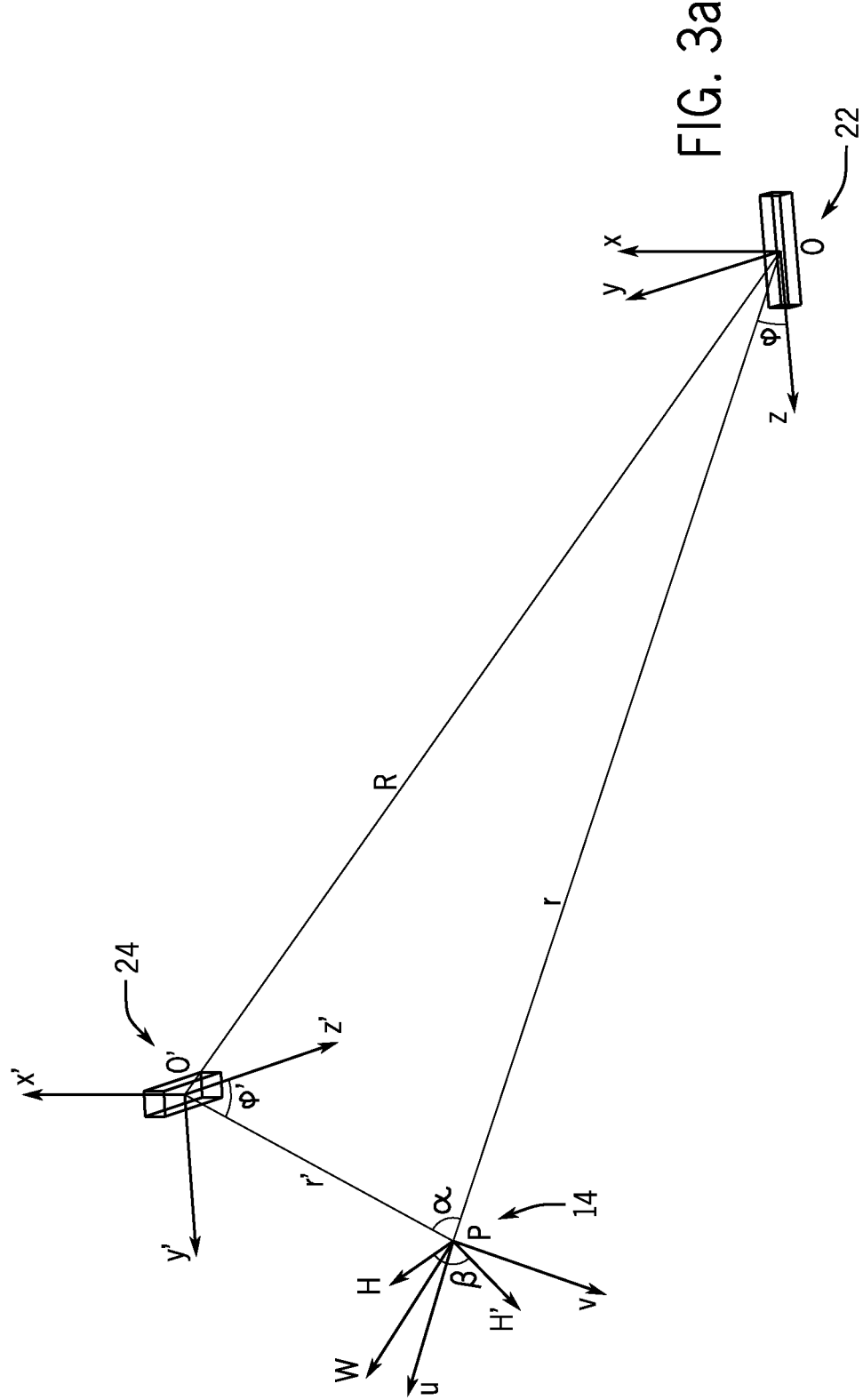
FIG. 3a is a diagram illustrating a two antenna system including antennas corresponding to vehicle 12 in communication with a key fob and corresponding magnetic fields.

Referring now to FIG. 3a, a diagram illustrating a two antenna system including, for example, antennas 22 (O) and 24 (O') corresponding to vehicle 12 and key fob 14 (P) is shown to illustrate magnetic fields generated in the system. The following equations are used to define the magnetic fields, distances, and angles in the system:

Coordinate systems:
1. XYZ with origin O
2. X'Y'Z' with origin O'
3. UVW with origin P Coil antenna O generates $\vec{H}$ ($H_U$, $H_V$, $H_W$) at P w.r.t. UVWP frame Coil antenna O' generates $\vec{H}'$ ($H'_U$, $H'_V$, $H'_W$) at P w.r.t. UVWP frame H fields from Antenna O and Antenna O' are linear related.

R=Distance from O to O'
At point P with Antenna O', H'=$\sqrt{H_U^2+H_V^2+H_W^2}$
At point P with Antenna O', H'=H'=$\sqrt{H'^2_U+H'^2_V+H'^2_W}$
For any two vectors in space:

$$\vec{H}\cdot\vec{H'} = H\cdot H'\cdot\cos\beta$$

$$\cos\beta = \frac{\vec{H}\cdot\vec{H'}}{H\cdot H'}$$

$$\vec{H}\cdot\vec{H'} = H_U\cdot H'_U + H_V\cdot H'_V + H_W\cdot H'_W$$

$$\cos\beta = \frac{H_U\cdot H'_U + H_V\cdot H'_V + H_W\cdot H'_W}{\sqrt{H_U^2+H_V^2+H_W^2}\cdot\sqrt{H'^2_U+H'^2_V+H'^2_W}}$$

The angles between the two antennas can be used by the fob to determine whether a relay attack has occurred.

Figure 3B:
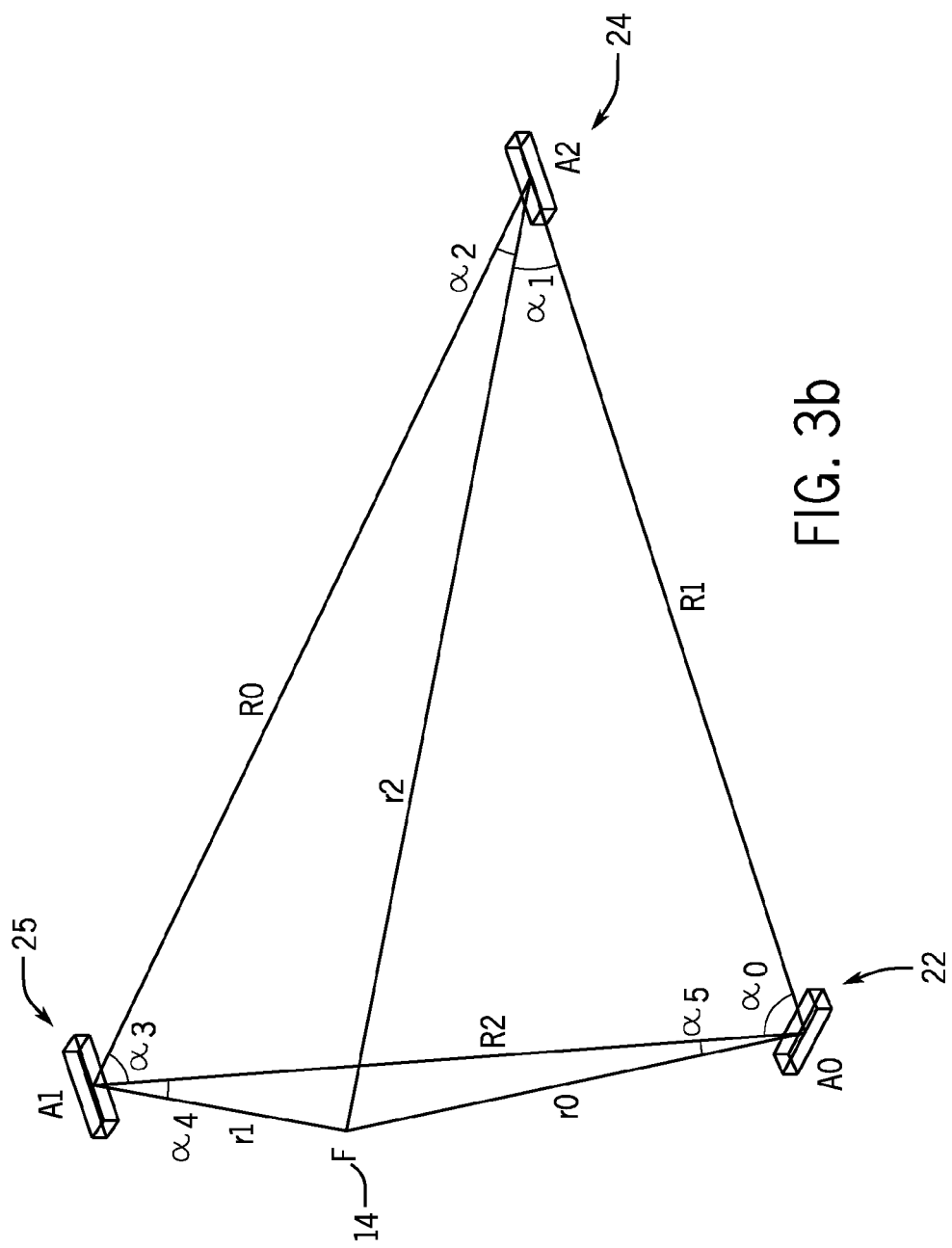
FIG. 3b is a diagram illustrating an isometric view of a three antenna system and magnetic fields generated by the antennas in the system.

Referring now to FIG. 3b, a diagram illustrating isometric view of a three antenna system including antennas 22 ($A_0$), 24 ($A_1$), and 25 ($A_2$) corresponding to vehicle 12 and corresponding key fob 14 is shown to illustrate magnetic fields generated by the antennas in the system. As described below, constant data (m0, m1, m2, R0, R1, R2, k, l, n), relative distances between the fob and antenna, and angle data corresponding the position of the fob as compared to the antenna systems can be used to calculate a magnetic field integrity of communications between the antennas, and therefore to determine whether signals are being transmitted from an authorized fob 14 or from another transmitter. The following equations are used to define the magnetic intensity vectors, distances, and angles between the antennas and key fob, as also shown in FIG. 3:

Coil antenna $A_0$ generates $\vec{H0}$
Coil antenna $A_1$ generates $\vec{H1}$
Coil antenna $A_2$ generates $\vec{H2}$
$R_0$=Distance from $A_1$ to $A_2$
$R_1$=Distance from $A_0$ to $A_2$
$R_2$=Distance from $A_0$ to $A_1$
r0=Distance from F to A0
r1=Distance from F to A1
r2=Distance from F to A2
$\varphi$0=Angle between r0 and antenna A0
$\varphi$1=Angle between r0 and antenna A1
$\varphi$2=Angle between r0 and antenna A2
In $\Delta$FA0A2, let $\angle$FA0A2=$\alpha$0, $\angle$FA2A0=$\alpha$1
In $\Delta$FA1A2, let $\angle$FA2A1=$\alpha$2, $\angle$FA1A2=$\alpha$3
In $\Delta$FA0A1, let $\angle$FA1A0=$\alpha$4, $\angle$FA0A1=$\alpha$5
In $\Delta$A0A1A2, let $\angle$A1A0 A2=A, $\angle$A0 A2A1=B, let $\angle$A0A1A2=C, $$\cos\alpha_0 = \frac{r_0^2+R_1^2-r_1^2}{2r_0R_1}$$

$$\cos\alpha_1 = \frac{r_2^2+R_1^2-r_0^2}{2r_2R_1}$$

$$\cos\alpha_2 = \frac{r_2^2R_0^2-r_1^2}{2r_2R_0}$$

$$\cos\alpha_3 = \frac{r_1^2+R_0^2-r_2^2}{2r_1R_0}$$

$$\cos\alpha_4 = \frac{r_0^2+R_2^2-r_1^2}{2r_0R_2}$$

$$\cos\alpha_5 = \frac{r_1^2+R_2^2-r_0^2}{2r_1R_2}$$

$$H_0 = \frac{m_0}{4\pi r_0^3}\sqrt{1+3\cos^2\varphi_0}$$

$$H_1 = \frac{m_1}{4\pi r_1^3}\sqrt{1+3\cos^2\varphi_1}$$

$$H_2 = \frac{m_2}{4\pi r_2^3}\sqrt{1+3\cos^2\varphi_2}$$

$$\cos\varphi_0 = \frac{\cos\alpha_0-\cos\alpha_5\cdot\cos A}{\sin A}+k$$

$$\cos\varphi_1 = \frac{\cos\alpha_1-\cos\alpha_2\cdot\cos B}{\sin B}+l$$

$$\cos\varphi_2 = \frac{\cos\alpha_3-\cos\alpha_4\cdot\cos C}{\sin C}+n$$

m0, m1, m2, are driving currents, R0, R1, R2, are the distances between antennas, and k, l, n are the angles in the preset coordinate system between the antennas.

With the constants and equations above, the magnetic vectors from the coil antennas 22, 24, and 25 can be calculated: $\vec{H0}$, $\vec{H1}$ and $\vec{H2}$. This data can be combined with data collected by the 3D coil antenna 38 in the fob 14 to calculate the orientation (Roll, Pitch, Yaw) relative to the antennas. If any of the constants (m0, m1, m2, R0, R1, R2, k, l, n) are missing or incorrect, the equation identifying $\vec{H0}$, $\vec{H1}$ and $\vec{H2}$ cannot be correctly solved. Under these conditions, the magnetic fields do not match the preset condition stored in memory of the devices, and magnetic integrity does not exist. The magnetic integrity calculations, therefore, can be used to evaluate whether communications between the antennas are with the fob 14 corresponding to the vehicle 12, or whether a relay station attack (RSA) has occurred.

Figure 4:
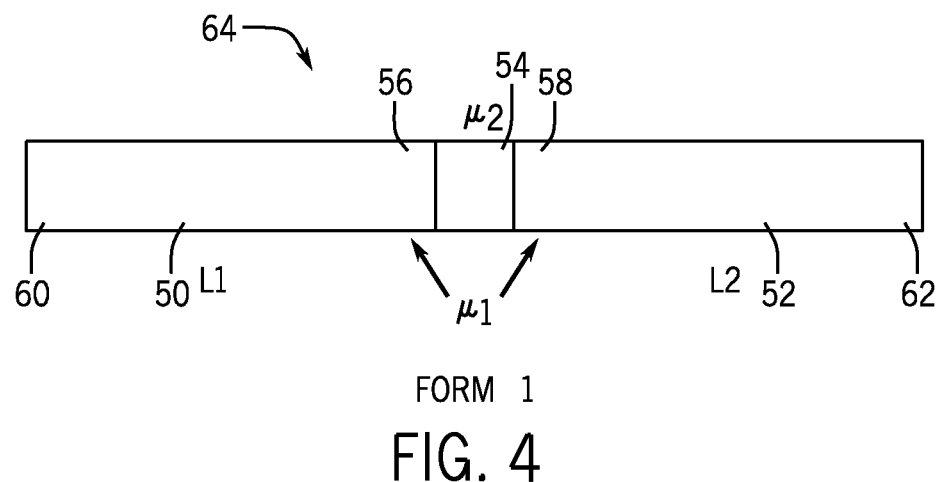
FIG. 4 illustrates driving currents applied to antennas that can be changed to differentiate the vehicle from a relay operated by a thief.
Figure 5:
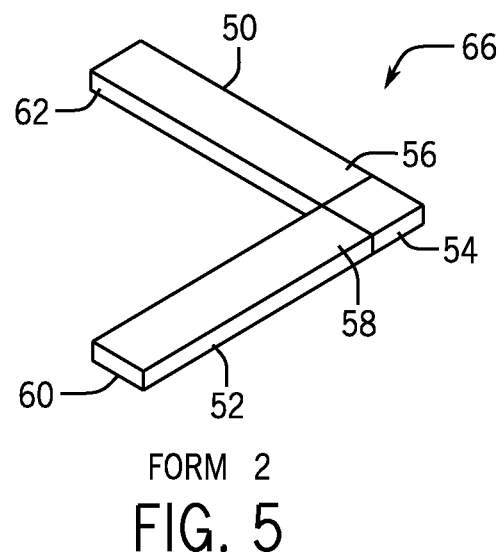
FIG. 5 illustrates another embodiment of driving currents applied to antennas that can be changed to differentiate the vehicle from a relay operated by a thief.
Figure 6:
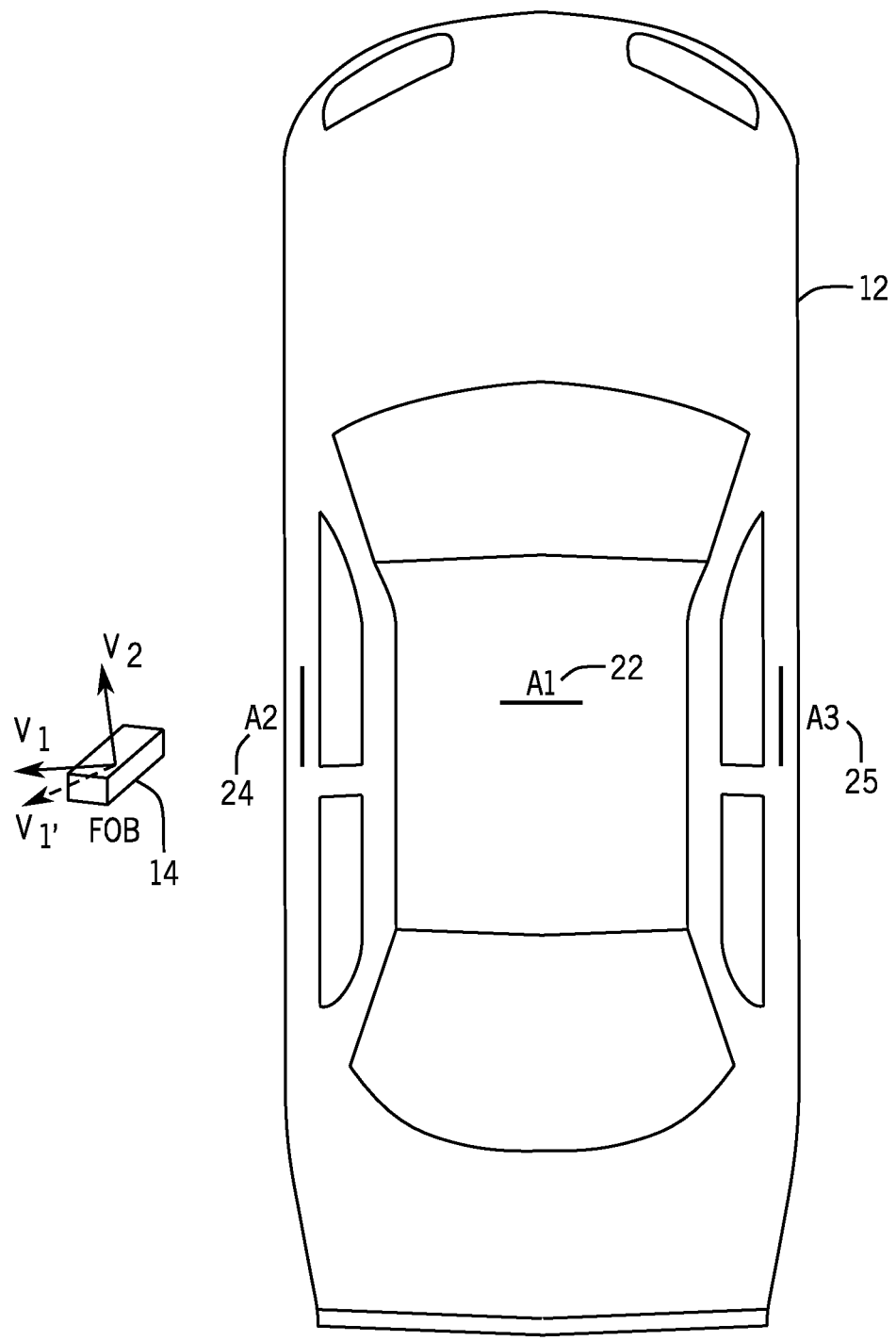
FIG. 6 is a top view of a vehicle and corresponding fob, illustrating antennas on the vehicle and vectors corresponding to the fob.

Referring now to FIGS. 4 and 5, in another aspect of the invention, the driving currents applied to antennas 22, 24, and 25 can be changed to differentiate the vehicle 12 as opposed to a relay operated by a thief. Two antenna configurations 64 and 66, respectively, that can be used as antennas 22, 24, and 25 are shown. Referring first to FIG. 4, antenna 64 comprises a central portion 54 of a first permittivity $\mu_1$, left and right linear elements 50 and 52 which are separated from the central portion 54 by linking sections 56 and 58 of a second permittivity $\mu_2$ End sections 60 and 62 are constructed of material having permittivity $\mu_2$ Referring now to FIG. 5, Antenna 66 is similar in construction. Here, the right and left elements 50 and 52 are angled with respect to one another, here shown as an angle of about ninety degrees. Other angles are also possible.

Referring now to FIGS. 1, 4, 5, 6 and 10, a first embodiment of a vehicle 12, corresponding key fob 14 (FIGS. 1 and 6), and a process 70 for preventing RSA is shown. The process 70 is started when a request for actuation of a vehicle device is initiated (e.g., lifting a door handle). Upon receipt of a request, in step 72, the antenna 22 in vehicle 12 transmits a signal to antenna 38 in key fob 14 to wake the key fob 14, as described above. In step 74, the controller 32 in key fob 14 calculates the angle $\beta_0$ between vectors $V_1$ and $V_2$ produced by the 3D coil in the key fob 14 which correspond to the magnetic intensity vectors produced by antennas 22 and 24. The controller 32 can compare this angle against stored data to determine whether the antennas are in the expected location.

In an additional security step, in step 78, the vehicle 12 can transmit an encrypted signal to the key fob 14, identifying a change in the driving current (L1/L2) in the antenna elements 50 and 52. In step 80, the change in driving current on antenna 22 results in a change in the magnetic field at antenna 22, which results in a corresponding change to the vector $V_1'$ at the fob 14. In step 82, the controller 32 in key fob 14 calculates the angle $\beta_0'$ between vectors $V_1'$ and $V_2$. The controller 32 then compares angles $\beta_0$ and $\beta_0'$. If $\beta_0 = \beta_0'$, there was no change in driving current from the transmitting source sending the signal to key fob 14, and an RSA likely occurred. Under these circumstances, the door locks, ignition, and other features can be immobilized or retained in a locked position, preventing access to the vehicle (step 86). Alternatively, if $\beta_0 \neq \beta_0'$, then the request was from a key fob 14 authorized to access the vehicle, and access is allowed. Additional mathematical verification of the expected value of $\beta_0'$ can also be calculated to assure authority to access functions in the vehicle.

Figure 7:
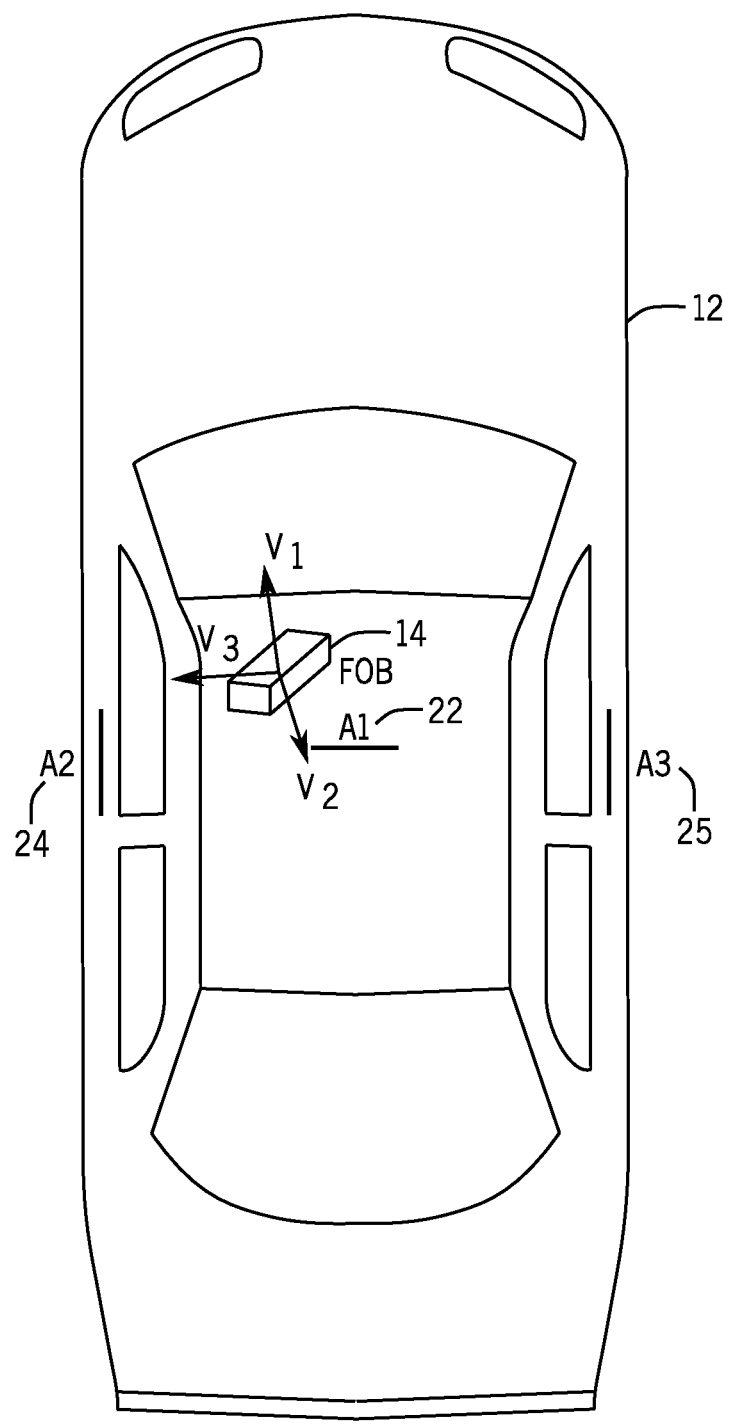
FIG. 7 is an alternate top view of a vehicle and corresponding fob, illustrating antennas on the vehicle and vectors corresponding to the fob.
Figure 8:
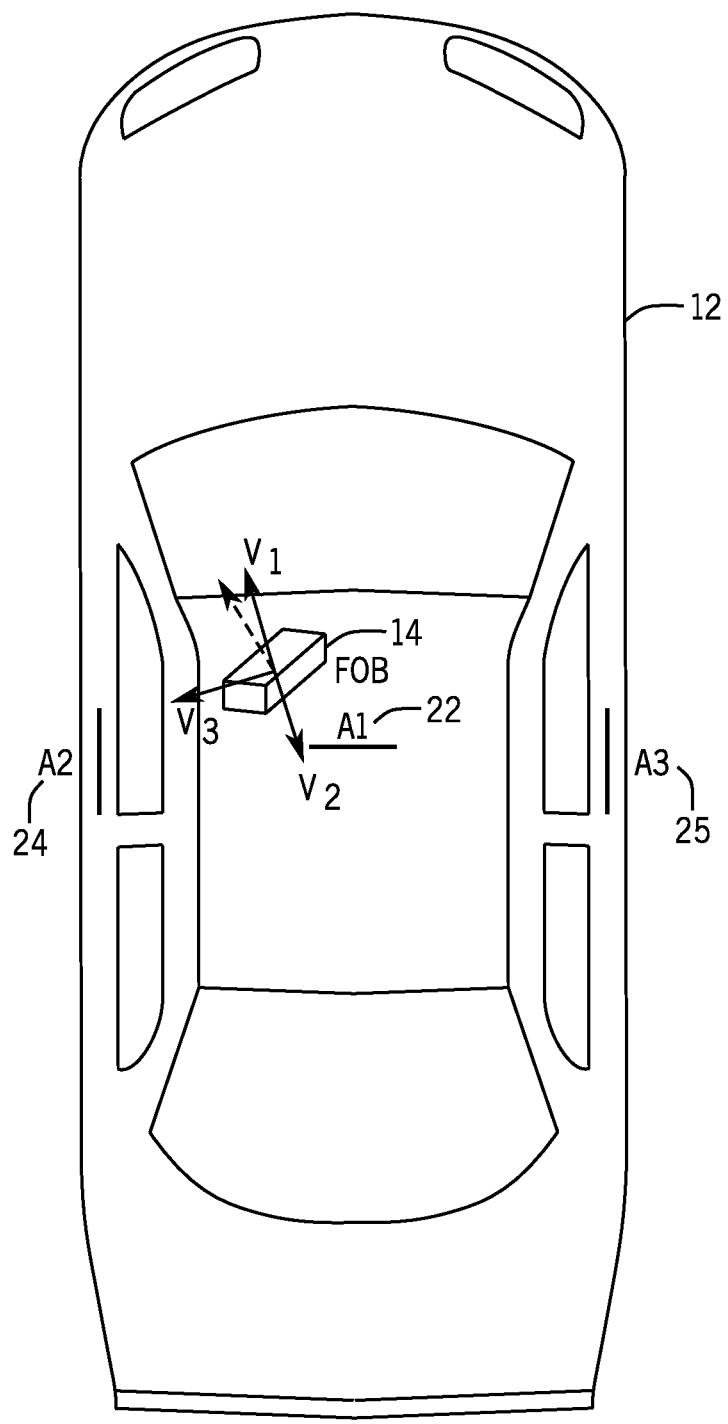
FIG. 8 is another top view of a vehicle and corresponding fob, illustrating antennas on the vehicle and vectors corresponding to the fob.
Figure 11:
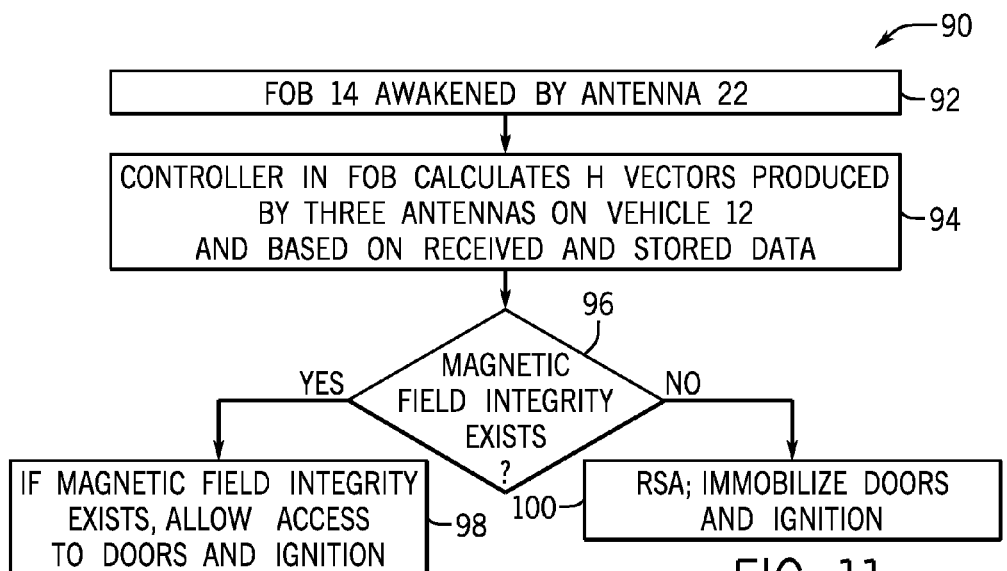
FIG. 11 is a block diagram illustrating an alternate set of process steps for preventing RSA.

Referring now to FIG. 7 and FIG. 11, an alternate embodiment of a vehicle 12, key fob 14 and corresponding process 90 for evaluating whether RSA has occurred is shown. Here, the process 90 relies on the magnetic integrity calculations discussed above with reference to FIG. 3. In step 92 fob 14 is awakened as described above. In step 94, the controller 32 in fob 14 performs the magnetic integrity calculations described based on the fob 14, and magnetic intensity vectors H produced by antennas 22, 24, and 25 on vehicle 12. In step 96, the controller 32 determines whether the magnetic vector equations can be solved, as described. If magnetic field integrity exists (step 96), the controller 32 can allow access to vehicle functions. Referring now to FIG. 8, as an additional security step, the driving currents in the antenna 22 can also be adjusted as described above with reference to FIG. 10, generating a vector $V_1'$ for comparison, as described above. Access to vehicle functions can be allowed only when both the magnetic integrity is verified, and the adjustment in angle is verified. Alternatively, if magnetic field integrity is not found in step 96, RSA has likely occurred, and the doors and other functions can be immobilized or locked (step 100).

Figure 9:
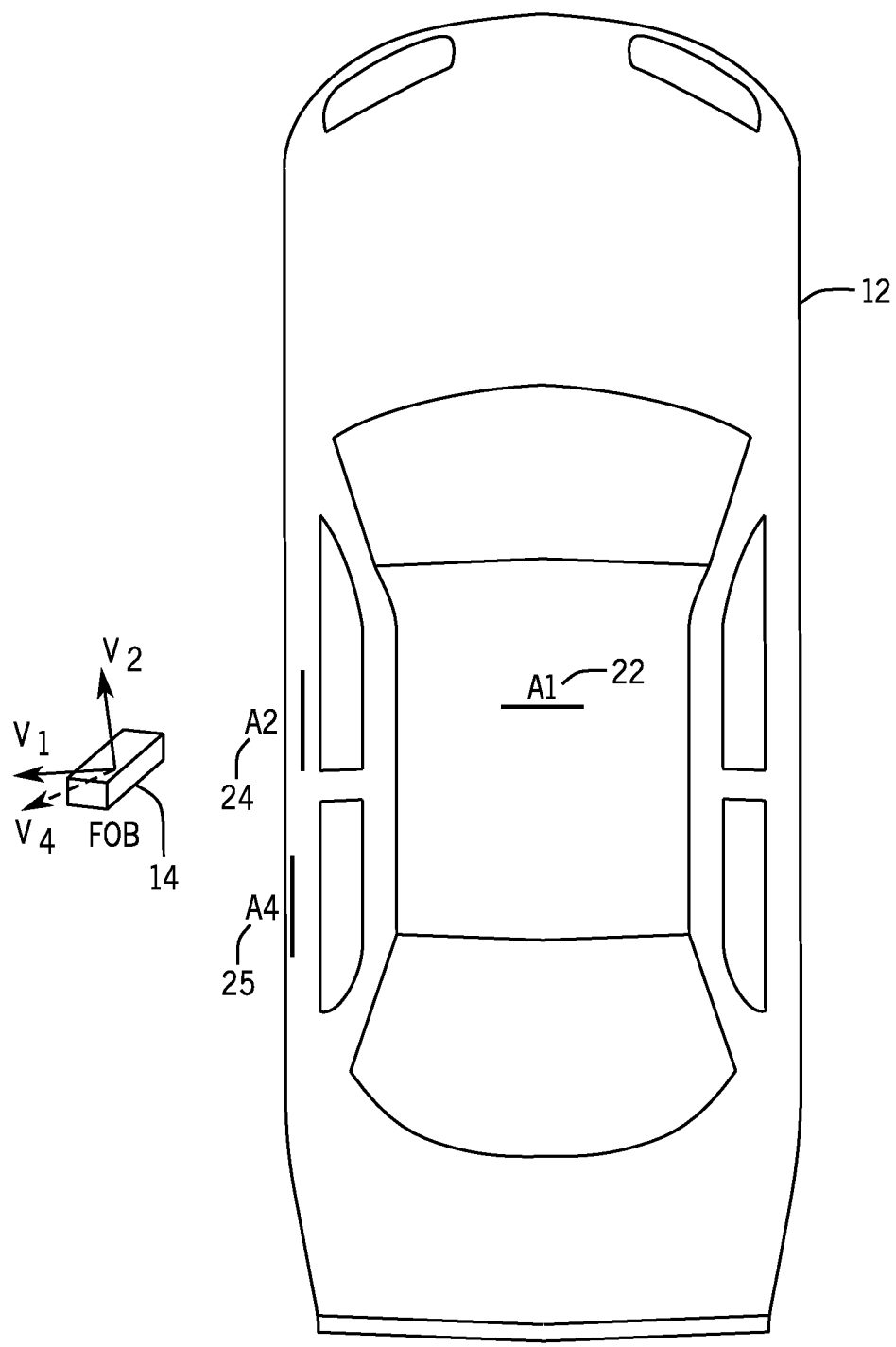
FIG. 9 is another top view of a vehicle and corresponding fob, illustrating antennas on the vehicle and vectors corresponding to the fob.
Figure 10:
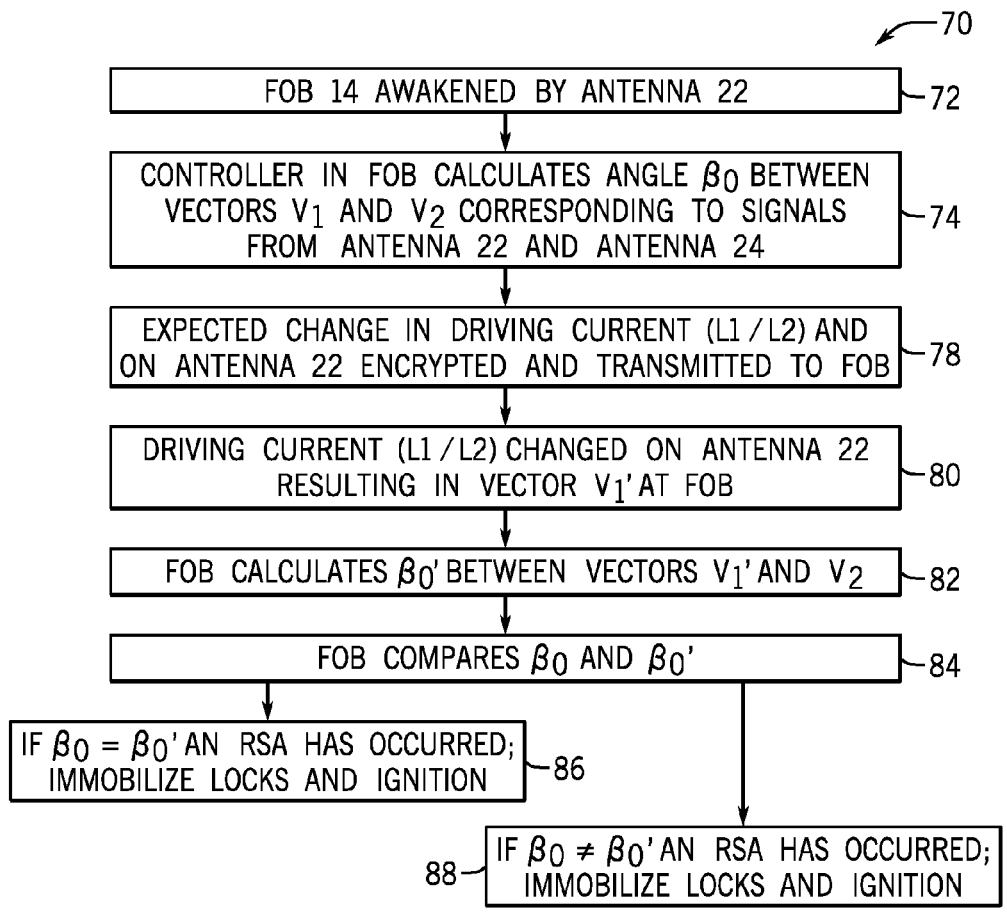
FIG. 10 is a block diagram illustrating one set of process steps for preventing RSA.

Referring now to FIG. 9, an alternate embodiment of a vehicle 12 is shown. Here the antenna 25 is positioned adjacent a rear passenger door. Calculations at the key fob 14 are made based on the locations of antennas 22, 24, and 25, as described above. These calculations can be used alone to identify the magnetic integrity of the relationships between the antennas in the system, or can be combined with a driving current adjustment in the antennas as described above.

Figure 12:
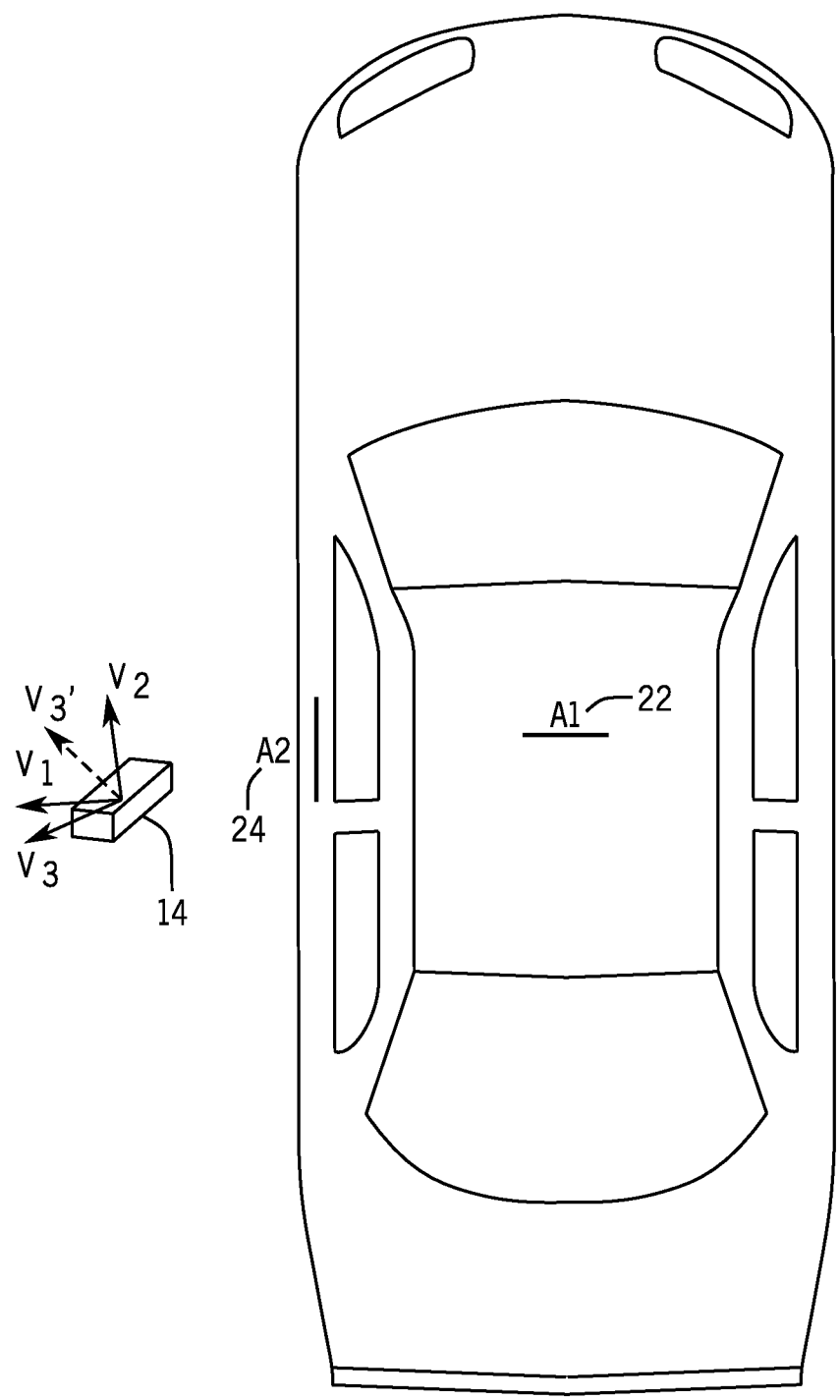
FIG. 12 is another top view of a vehicle and corresponding fob, illustrating antennas on the vehicle and vectors corresponding to the fob.
Figure 13:
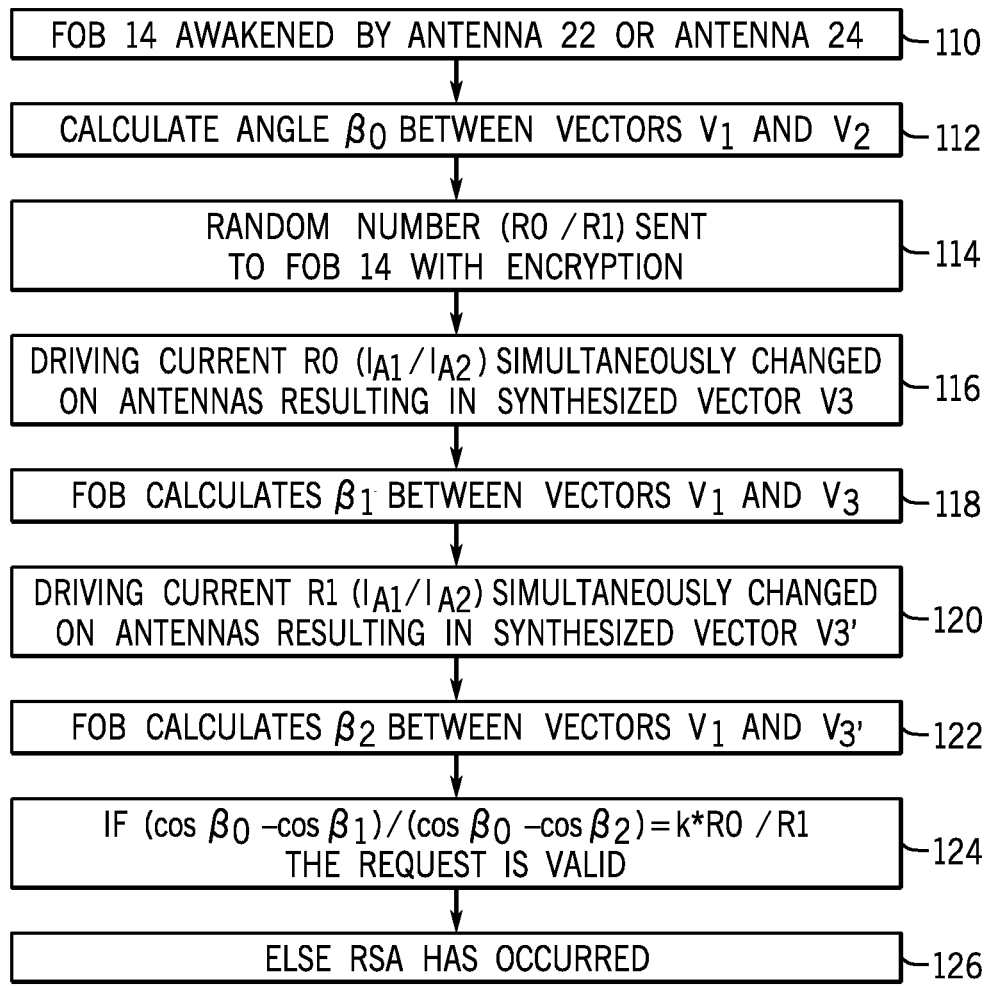
FIG. 13 is a block diagram illustrating an alternate set of process steps for preventing RSA.

Referring now to FIG. 12, another alternative embodiment of a vehicle 12 is shown. Here two antennas are used, an antenna 22 positioned in a central location in or on the vehicle, such as the center console, and another antenna 24 positioned adjacent the driver's side door. Referring now to FIG. 13, a series of steps for determining whether to allow access to the vehicle of FIG. 12 is shown. Initially, in step 110, the fob 14 is awoken from one of antenna 22 or antenna 24. In step 112, the controller 32 in the fob 14 evaluates field strength from signals transmitted from antennas 22 and 24, represented by initial vectors V1 and V2, and calculates an initial angle $\beta_0$ between the vectors. As part of the wakeup sequence of communications between the vehicle 12 and the fob 14, a random number R0/R1 is encrypted and sent to the fob 14, which includes a stored key to decrypt the data (step 114). A driving current R0 is applied simultaneously to the antennas 22 and 24, resulting in a first synthesized vector $V_3$. (step 116) The controller 32 then calculates a first verification angle $\beta_1$ between the vectors $V_1$ and $V_3$. (step 118) Subsequently, a second driving current R1 ($I_{A1}/I_{A2}$) is applied simultaneously to the antennas 22 and 24, resulting in a synthesized vector $V_3'$. The controller 32 then calculates a second verification angle $\beta_2$ between the vectors $V_1$ and $V_3'$. (step 118)

To determine whether RSA has occurred, the controller 32 then performs one of the following calculations:

$$(\cos\beta_0 - \cos\beta_1)/(\cos\beta_0 - \cos\beta_2) = k * R0/R1$$

or $$\frac{\sin(\beta_0 - \beta_2)}{\sin(\beta_2)} = \frac{R_0}{R_1} \cdot k$$

Where k is a constant that can be stored in memory in either the fob 14 or vehicle 12. (step 124) If the equation is satisfied, the request to access the vehicle is determined to be valid and access to perform functions, such as open the doors, or start the ignition, is granted. If the equation is not satisfied (step 126), a relay station attack has occurred, and the vehicle is immobilized. Access to the doors and ignition is therefore prevented.

Although the system is described with calculations performed by the controller 32 in fob 14, the calculations can be performed by the controller 16 in vehicle 12. The constants R0/R1 and k can be stored in memory in either the vehicle 12 or fob 14. This verification can also be used in conjunction with other verification procedures described above.

Although specific embodiments are described above, it will be apparent to those of ordinary skill that a number of variations can be made within the scope of the disclosure For example, calculations of magnetic integrity can be made by the controller 32 in the key fob 14, the controller 16 in the vehicle 12, or both. The number of antennas associated with the vehicle 12 and the fob 14 can vary, and the magnetic integrity equations adjusted accordingly. In some embodiments, a step of adjusting the driving current in an antenna as discussed above with reference to process 90 can be performed before magnetic integrity calculations. Although specific embodiments are described above, it will be apparent that various algorithms that include measuring the angles between two or three different antennas, determining the location of the key fob relative to the antennas, and adjusting the currents in the antennas, as described above, can be implemented in various orders to provide varying levels of assurance that a relay attack has not occurred. Additionally, the method of relay attack avoidance used by a vehicle and key fob system can be intermittently changed to further thwart attempts to steal a vehicle. Although the fob is described herein as a key fob, as described above, various types of electronic equipment that include processors and radiofrequency communication devices can be used in the present application. For example, the functions described with reference to a key fob can be provided on personal communications devices such as cellular phones, smart phones, tablets, laptops, and other types of devices.

It should be understood, therefore, that the methods and apparatuses described above are only exemplary and do not limit the scope of the invention, and that various modifications could be made by those skilled in the art that would fall within the scope of the invention. To apprise the public of the scope of this invention, the following claims are made.

We claim:
1. A passive entry system for an automotive vehicle comprising:
   a control unit configured to broadcast a wake-up signal to prompt a fob to power-up if the fob is in a low-power consumption mode and to transmit signals through a plurality of antennas coupled to the vehicle; and
   the fob configured to recognize the wake-up signal and to generate a response signal for the control unit in response to recognize the wake-up signal, the fob including a fob controller programmed to:
   receive signals transmitted from each of the plurality of antennas coupled to the vehicle;
   retrieve constant values from a memory;
   calculate a magnetic integrity defining the relative position of each of the plurality of antennas; and
   selectively allow access to the vehicle when magnetic integrity is found.

2. The passive entry system of claim 1, wherein the fob controller is programmed to calculate an angle between vectors corresponding to signals corresponding to at least two of the antennas.

3. The passive entry system of claim 2, wherein the control unit is further programmed to change a driving current on at least one of the plurality of antennas, and the fob controller is programmed to calculate a second angle between vectors corresponding to signals corresponding to at least two of the antennas.

4. The passive entry system of claim 3, wherein the fob controller is further programmed to compare the angle and the second angle.

5. The passive entry system of claim 4, wherein the control unit immobilizes at least one of a vehicle lock and a vehicle ignition when the angle equals the second angle.

6. The passive entry system of claim 4, wherein the control unit enables access to at least one of a vehicle lock and a vehicle ignition when the angle does not equal the second angle.

7. A passive entry system for an automotive vehicle comprising:
   a control unit configured to broadcast a wake-up signal to prompt a fob to power-up if the fob is in a low-power consumption mode and to apply a driving current to and transmit signals through a plurality of antennas coupled to the vehicle; and
   the fob configured to recognize the wake-up signal and to generate a response signal for the control unit in response to recognizing the wake-up signal, the fob including a fob controller programmed to:
   receive signals transmitted from each of the plurality of antennas coupled to the vehicle;
   calculate a first angle between the signals transmitted by at least two of the antennas;
   receive an encrypted signal from the control unit describing a change in driving current applied to the antenna;
   calculate a second angle between the signals transmitted by at least two of the antennas;
   compare the first angle to the second angle; and
   deny access to vehicle functions if the first angle is substantially equal to the second angle.

8. A passive entry system for an automotive vehicle comprising:
   a control unit configured to broadcast a wake-up signal to prompt a fob to power-up if the fob is in a low-power consumption mode and to transmit signals through a first and a second antenna coupled to the vehicle; and
   the fob configured to recognize the wake-up signal and to generate a response signal for the control unit in response to recognize the wake-up signal, the fob including a fob controller programmed to:
   receive signals transmitted from each of the first and second antennas coupled to the vehicle;
   retrieve a constant verification value from a memory, the constant verification value defining a ratio of driving currents applied to the first and second antennas for fob verification; and
   calculate an initial angle between a vector representing an output of the first antenna and a vector representing an output of the second antenna;
   simultaneously drive the second antenna with a pre-defined driving current ratio relative to the driving current of the first antenna retrieved from memory;
   calculate a first synthesized vector based on the output of the antennas after the pre-defined driving current is applied;
   simultaneously drive the second antenna with a second pre-defined driving current ratio relative to the driving current of the first antenna retrieved from memory;
   calculate a second synthesized vector based on the output of the antennas after the pre-defined driving current is applied;
   calculate a first verification angle between the vector representing the output of the first antenna and the output of the first synthesized vector and a second verification angle between the vector representing the output of the first antenna and the second synthesized vector;
   calculate a verification ratio as the difference between the cosine of the initial angle and the cosine of the first verification angle and the difference between the cosine of the initial angle and the cosine of the second verification angle;
   compare the verification ratio to a predefined stored constant; and allow access to the vehicle if the calculated ratio is substantially equivalent to the verification ratio.

9. A passive entry system comprising:
   a control unit configured to broadcast a wake-up signal to prompt a fob to power-up if the fob is in a low-power consumption mode and to transmit signals through a plurality of antennas coupled to a vehicle; and
   the fob configured to recognize the wake-up signal and to generate a response signal for the control unit in response to recognize the wake-up signal, the fob including a fob controller programmed to:
   receive signals transmitted from each of the plurality of antennas coupled to the vehicle;
   calculate an angle between vectors produced by at least two of the plurality of antennas;
   calculate a second angle between a vector corresponding to one of the plurality of antennas and a synthesized vector resulting from a change in driving current on at least one of the antennas;
   calculate a third angle between a vector corresponding to one of the plurality of antennas and a synthesized vector resulting from a second change in driving current on at least one of the antennas;
   calculate a magnetic integrity defining the relative position of each of the plurality of antennas; and
   selectively allow access to the vehicle when magnetic integrity is found.

10. The passive entry system of claim 1, wherein the constant values each define a ratio of driving currents applied to the plurality of antennas for verification of the fob.

11. The passive entry system of claim 1, wherein the fob controller is programmed to:
   simultaneously drive a first antenna of the plurality of antennas with a pre-defined driving current ratio relative to a driving current of a second antenna of the plurality of antennas retrieved from memory; and
   simultaneously drive the second antenna with a second pre-defined driving current ratio relative to the driving current of the first antenna retrieved from memory.

12. The passive entry system of claim 7, wherein the control unit is further programmed to change the driving current on at least one of the plurality of antennas.

13. The passive entry system of claim 12, wherein the control unit immobilizes at least one of a vehicle lock and a vehicle ignition when the first angle equals the second angle.

14. The passive entry system of claim 13, wherein the control unit enables access to at least one of a vehicle lock and a vehicle ignition when the first angle does not equal the second angle.

15. The passive entry system of claim 7, wherein the encrypted signal defines a ratio of driving currents applied to the plurality of antennas for verification of the fob.

16. The passive entry system of claim 7, wherein the fob controller is programmed to:
   simultaneously drive a first antenna of the plurality of antennas with a pre-defined driving current ratio relative to a driving current of a second antenna of the plurality of antennas retrieved from a memory; and
   simultaneously drive the second antenna with a second pre-defined driving current ratio relative to the driving current of the first antenna retrieved from the memory.

17. The passive entry system of claim 9, wherein the control unit is further programmed to change a driving current on at least one of the plurality of antennas.

18. The passive entry system of claim 17, wherein the control unit immobilizes at least one of a vehicle lock and a vehicle ignition when the angle equals the second angle.

19. The passive entry system of claim 9, wherein the fob controller is programmed to:
   retrieve a constant verification value from a memory, the constant verification value defining a ratio of driving currents applied to a first antenna of the plurality of antennas and a second antenna of the plurality of antennas for verification of the fob;
   simultaneously drive the first antenna with a first pre-defined driving current ratio relative to a driving current of the second antenna retrieved from the memory; and
   simultaneously drive the second antenna with a second pre-defined driving current ratio relative to the driving current of the first antenna retrieved from the memory.

* * * * *